United States Patent
Roussanova

(10) Patent No.: US 12,428,082 B2
(45) Date of Patent: Sep. 30, 2025

(54) MECHANICAL WALKING DEVICE WITH STEP SIZE ADJUSTMENT

(71) Applicant: Elena Roussanova, Costa Mesa, CA (US)

(72) Inventor: Elena Roussanova, Costa Mesa, CA (US)

(73) Assignee: Elena Roussanova, Costa Mesa, CA (US)

( * ) Notice: Subject to any disclaimer, the term of this patent is extended or adjusted under 35 U.S.C. 154(b) by 636 days.

(21) Appl. No.: 17/891,919

(22) Filed: Aug. 19, 2022

(65) Prior Publication Data
US 2022/0396320 A1  Dec. 15, 2022

(51) Int. Cl.
*B62D 57/032* (2006.01)

(52) U.S. Cl.
CPC .................................. *B62D 57/032* (2013.01)

(58) Field of Classification Search
CPC .............................. B62D 57/032; B62D 57/02
USPC ........................................................ 180/8.1
See application file for complete search history.

(56) References Cited

U.S. PATENT DOCUMENTS

| | | | | |
|---|---|---|---|---|
| 2,827,735 A * | 3/1958 | Grimm, Jr. | ............ | A63H 11/20 280/1.181 |
| 2,924,042 A * | 2/1960 | Byrtus | ................... | A63H 11/18 446/356 |
| 4,629,440 A * | 12/1986 | McKittrick, Jr. | ...... | A63H 11/20 180/8.6 |
| 5,423,708 A * | 6/1995 | Allen | ................... | A63H 11/205 446/353 |
| 5,685,383 A * | 11/1997 | Ferrante | ............... | B62D 57/032 901/1 |
| 6,238,264 B1 * | 5/2001 | Kazami | ................ | A63H 11/205 446/368 |
| 6,478,314 B1 * | 11/2002 | Klann | ..................... | A63H 11/00 180/8.5 |
| 6,481,513 B2 * | 11/2002 | Buehler | ................. | B62D 63/02 901/1 |
| 6,866,557 B2 * | 3/2005 | Randall | .................. | B62D 57/02 446/330 |

(Continued)

FOREIGN PATENT DOCUMENTS

CN   114475849   5/2022

OTHER PUBLICATIONS

McCarthy, "Six-Legged Mechanical Walkers: Spring 2020 Highlights", Mechanical Design 101, Mechanical Design Educational Resource, Jun. 19, 2020, 2 pages.

*Primary Examiner* — Valentin Neacsu
*Assistant Examiner* — Michael R Stabley
(74) *Attorney, Agent, or Firm* — Fish IP Law, LLP

(57) ABSTRACT

A mechanical walker has at least three legs on each side, and relative step sizes on the left and right sides can be modified to alter directional movement of the walker. Walkers can be powered in any suitable manner, including using human and/or electrical power. Walkers preferably have an upper linkage between first and third legs, a lower linkage between first and third legs, and an intermediate linkage between second and third legs. Stepping motions on each side are executed by moving the intermediate linkage in a circular motion having a variable radius. The intermediate linkage includes a pin carried on a crank wheel to provide the circular motion, and moving the pin radially with respect to an axle of the crank wheel alters the step size.

8 Claims, 4 Drawing Sheets

(56) References Cited

U.S. PATENT DOCUMENTS

| | | | | |
|---|---|---|---|---|
| D512,086 S * | 11/2005 | Dirks | .......................... | D15/199 |
| 6,964,309 B2 * | 11/2005 | Quinn | .................. | B62D 57/022 |
| | | | | 180/8.5 |
| 7,249,640 B2 * | 7/2007 | Horchler | .............. | B62D 57/022 |
| | | | | 180/8.5 |
| 7,398,843 B2 * | 7/2008 | Buehler | ................. | B62D 61/10 |
| | | | | 280/5.2 |
| 7,541,764 B2 * | 6/2009 | Takenaka | ............... | B25J 13/085 |
| | | | | 318/568.2 |
| 7,603,199 B2 * | 10/2009 | Takenaka | ............... | B25J 13/085 |
| | | | | 700/246 |
| 7,734,375 B2 * | 6/2010 | Buehler | .................. | B25J 9/106 |
| | | | | 483/901 |
| 7,946,902 B2 * | 5/2011 | Willett | ................. | A63H 17/006 |
| | | | | 446/376 |
| 8,157,031 B2 * | 4/2012 | Xu | ........................ | B62D 57/02 |
| | | | | 280/1.181 |
| 9,222,493 B2 * | 12/2015 | Riskas | .................. | F15B 21/085 |
| 9,359,028 B2 * | 6/2016 | Jun | ...................... | B62D 57/032 |
| 9,492,760 B2 * | 11/2016 | Randall | ................ | A63H 11/205 |
| 10,202,188 B2 * | 2/2019 | del Castillo | ........... | B64U 10/16 |
| 10,301,017 B2 * | 5/2019 | del Castillo | ........... | B64U 10/70 |
| 10,478,975 B2 * | 11/2019 | Onal | .................... | B62D 57/032 |
| 10,926,409 B1 * | 2/2021 | Palmer | ................. | B62D 57/032 |
| 2015/0041227 A1 * | 2/2015 | Jun | ...................... | B62D 57/032 |
| | | | | 901/1 |
| 2016/0318194 A1 * | 11/2016 | Onal | .................... | B62D 57/032 |
| 2018/0127092 A1 * | 5/2018 | del Castillo | ............ | B64C 25/10 |

* cited by examiner

MECHANICAL WALKING DEVICE WITH STEP SIZE ADJUSTMENT

FIELD OF THE INVENTION

The field of the invention is multi-leg mechanical walking devices for uneven terrain.

BACKGROUND

The background description includes information that may be useful in understanding the present invention. It is not an admission that any of the information provided herein is prior art or relevant to the presently claimed invention, or that any publication specifically or implicitly referenced is prior art.

The known walking devices, including for example the various Jansen walking devices, https://www.instructables.com/theo-jansen-machine/, and CN114475849A, have difficulty maintaining stability while steering (changing direction). These known devices change direction by increasing the speed of leg movement on one side relative to the other, but produce instability in the process. The solution has been to provide a large number of legs on each side, in some cases eight or more, but that causes even more problems because the legs tend to become asynchronous.

It appears that no one has devised a good solution for walking devices with at least three legs on each side.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Thus, there is still a need for a mechanical walker with variable step sizes.

SUMMARY OF THE INVENTION

The inventive subject matter provides apparatus, systems and methods in which a mechanical walker is controlled by modifying relative step sizes of the legs of the walker. Walkers have at least three legs on each side, and the relative step sizes on the left and right sides can be modified to alter directional movement of the walker. Walkers can be powered in any suitable manner, including using human and/or electrical power.

In preferred embodiments, the walker on each side has an upper linkage between first and third legs, a lower linkage between first and third legs, and an intermediate linkage between second and third legs. Stepping motions on each side are executed by moving the intermediate linkage in a circular motion having a variable radius.

In particularly preferred embodiments, the intermediate linkage includes a pin carried on a crank wheel to provide the circular motion, and moving the pin radially with respect to an axle of the crank wheel alters the step size. A cord through the axle can advantageously be used to move the pin radially with respect to the axle.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1A:
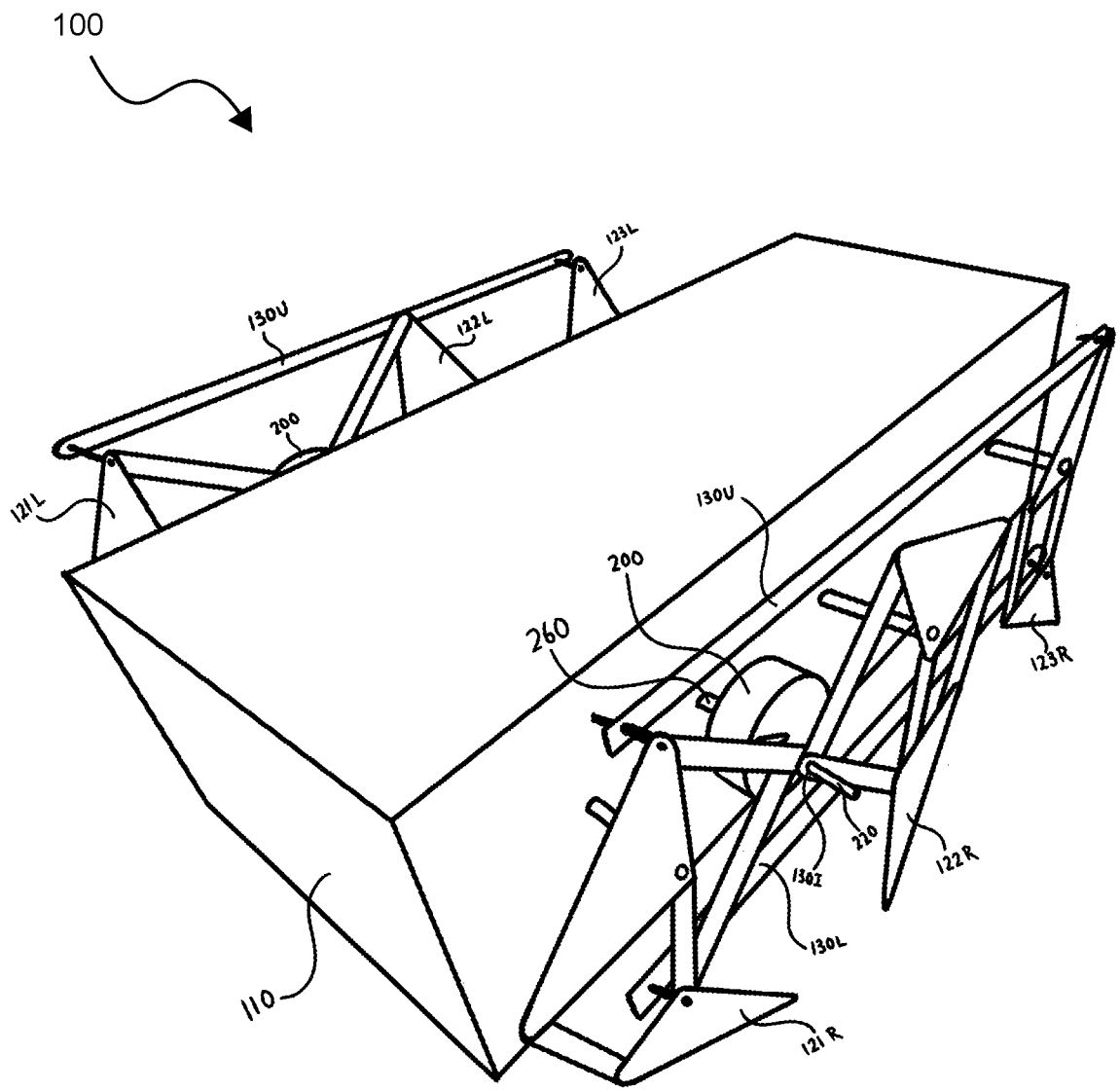
FIG. 1A is a perspective view of a multi-leg walker having variable step sizes.
Figure 1B:
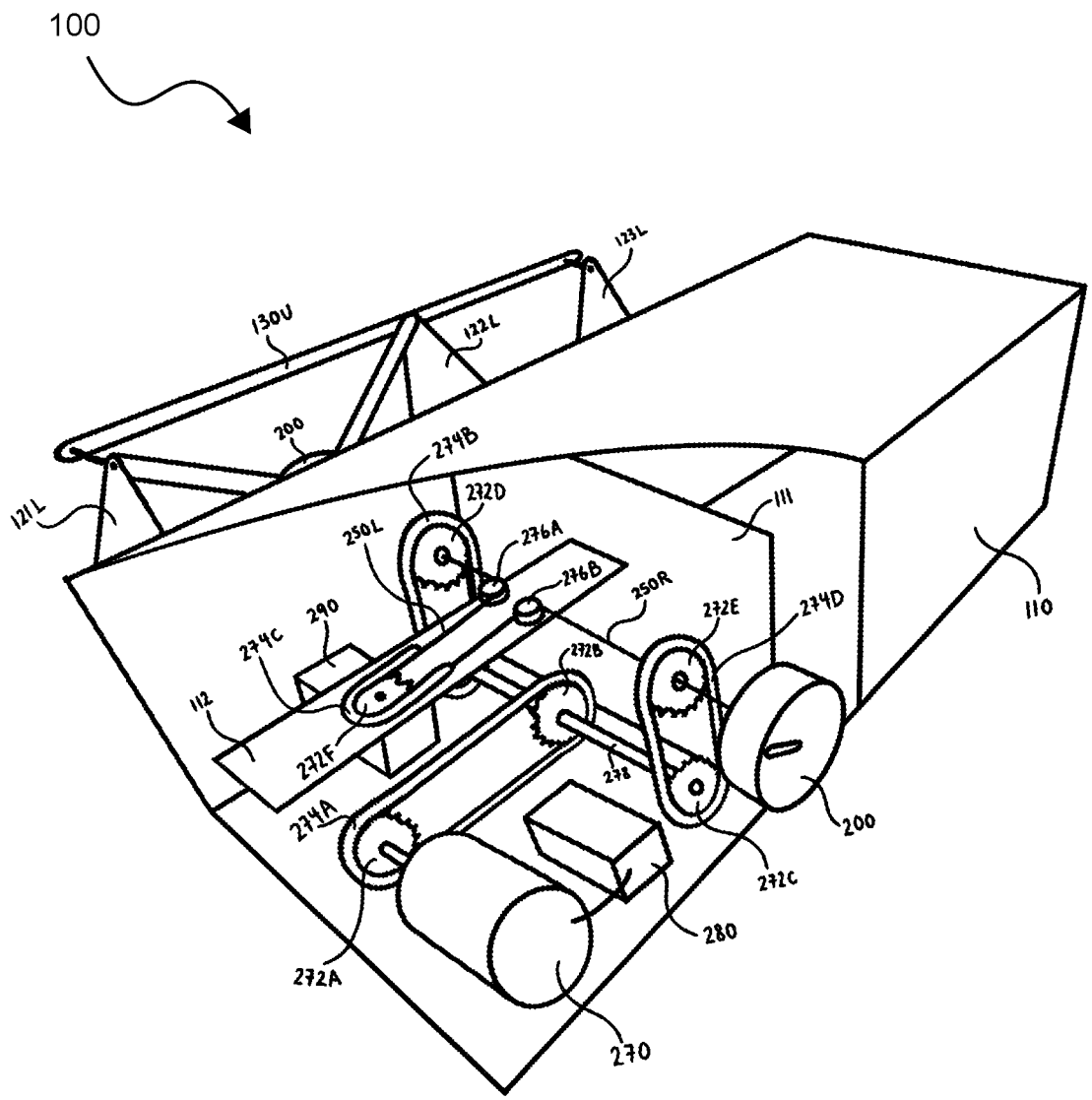
FIG. 1B is a partial cutaway of the multi-leg walker of FIG. 1A.

In FIGS. 1A and 1B a walker 100 generally comprises a partial cut open housing 110, right legs 121R, 122R, 123R, left legs 121L, 122L, 123L, upper linkage 130U, lower linkage 130L, and intermediate linkage 130I, crank wheel 200, crank pin 220, and crank axle 260, motor 270 and drive sprocket 272, drive chain 274, and power supply 280.

In operation, power supply 280 powers motor 270, which turns sprocket 272 and moves drive train 274 to turn crank axle 260. Rotation of crank axle 260 rotates crank wheel 200 which moves crank pin 220 in a circular motion. Motion of crank pin drives intermediate linkage 130I, which moves right legs 122R and 123R, and movement of right leg 123R moves upper linkage 130U and lower linkage 130L. Movement of the upper linkage 130U and lower linkage 130L move right leg 121R. Although not shown, there are corresponding linkages for the left legs 121L, 122L, 123L.

Servo 290 operates opposing left and right cords 250L, 250R through steering sprocket 292. The left cord 250L control step sizes of the left legs 121L, 122L, 123L, and the right cord 250L control step sizes of the right legs 121R, 122R, 123R.

Figure 2A:
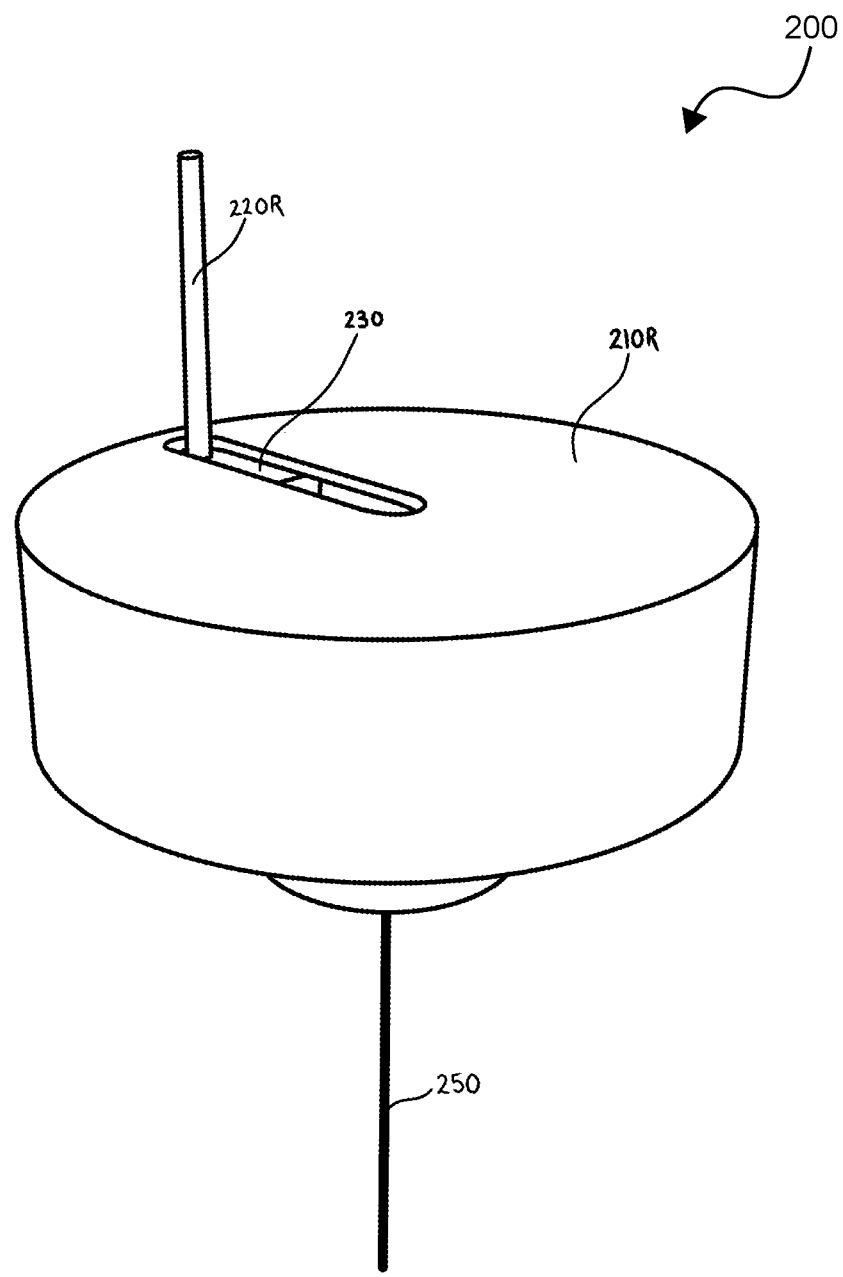
FIG. 2A is perspective view of the right crank wheel of the multi-leg walker of FIG. 1A, having a variable radius pin.
Figure 2B:
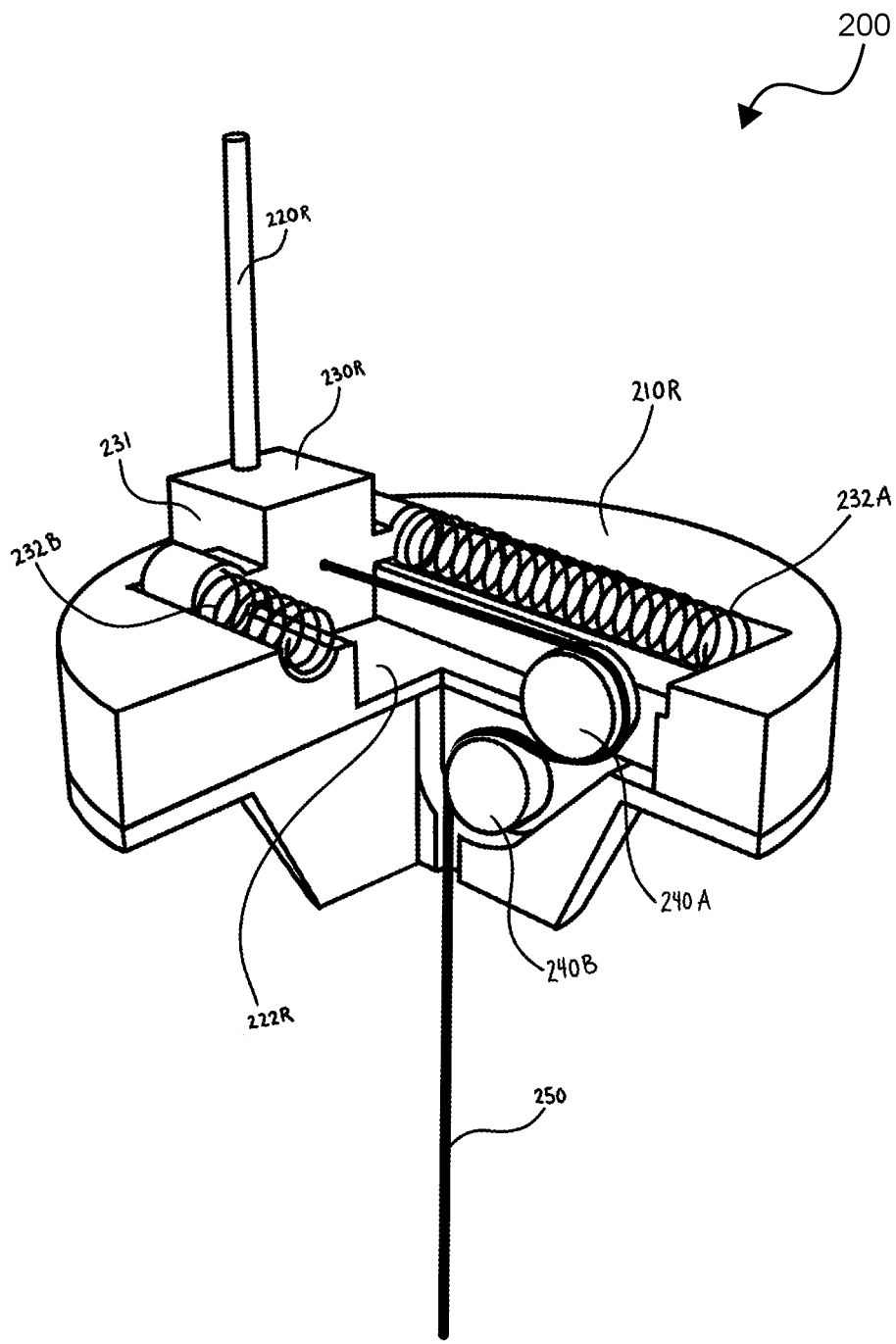
FIG. 2B is schematic of the right crank wheel of FIG. 2A.

In FIGS. 2A and 2B a crank wheel 200R generally comprise a housing 210R, a crank pin 220R movably disposed in a slot 222R, a slider mechanism 230R, first and second pulleys 240A, 240B. The crank wheel 200R cooperates with a cord 250R running through an crank axle 260R, and around first and second pulleys 240A, 240B to slider mechanism 230R.

The housing 210R can have any suitable dimensions, including for example, 3-7 cm in diameter for a small walker, or 30-60 cm for big walker. Housing 210 R could advantageously be about 10-15% of a height of the walker. Housing 210R can be made of metal or any other suitably strong material.

Slider mechanism 230 generally comprises a slider 231 biased by springs 232A, 232B. The slider is mechanically interposed between the pin 220 and the cord 250.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of operating a mechanical walker, comprising:
   providing the walker with a left grouping of at least first, second, and third left legs and a right grouping of at least first, second, and third right legs;
   using a left crank wheel to modify a step size of the left grouping of legs;
   using a right crank wheel to modify a step size of the right grouping of legs;
   using internal mechanisms of the left and right crank wheels to modify relative step sizes between the left and right groupings.

2. The method of claim 1, further comprising using energy stored within the walker to power the walker.

3. The method of claim 1, further comprising an upper linkage between first and third right legs, a lower linkage between first and third right legs.

4. The method of claim 3, further comprising an intermediate linkage between second and third right legs, and driving the right grouping of legs by moving the intermediate linkage in a circular motion having a radius.

5. The method of claim 1, further comprising an intermediate linkage between second and third right legs, and driving the right grouping of legs by moving the intermediate linkage in a circular motion having a radius.

6. The method of claim 5, further comprising modifying the step size of the right grouping by altering the radius.

7. The method of claim 5, further comprising using a pin on a crank wheel to provide the circular motion, and movement of the pin radially with respect to an axle of the crank wheel.

8. The method of claim 7, further comprising passing a cord through the axle to move the pin radially with respect to an axle.

* * * * *